United States Patent
Meer et al.

(10) Patent No.: US 10,031,344 B2
(45) Date of Patent: Jul. 24, 2018

(54) ROTATIONAL ALIGNMENT OF A CIRCULAR DISPLAY AND A CIRCULAR LENS

(71) Applicant: Google Technology Holdings LLC, Mountain View, CA (US)

(72) Inventors: Daniel J. Meer, Chicago, IL (US); Thomas E. Gitzinger, Libertyville, IL (US)

(73) Assignee: Google Technology Holdings LLC, Mountain View, CA (US)

(*) Notice: Subject to any disclaimer, the term of this patent is extended or adjusted under 35 U.S.C. 154(b) by 155 days.

(21) Appl. No.: 14/314,092

(22) Filed: Jun. 25, 2014

(65) Prior Publication Data
US 2015/0355475 A1   Dec. 10, 2015

Related U.S. Application Data

(60) Provisional application No. 62/008,578, filed on Jun. 6, 2014.

(51) Int. Cl.
| | |
|---|---|
| *G02B 27/62* | (2006.01) |
| *G06F 1/16* | (2006.01) |
| *G02B 27/36* | (2006.01) |

(52) U.S. Cl.
CPC ............ *G02B 27/62* (2013.01); *G02B 27/36* (2013.01); *G06F 1/163* (2013.01)

(58) Field of Classification Search
CPC .... G02B 27/0006; G02B 11/27; G02B 27/62; G02B 3/00; G06F 1/1643; G06F 1/163
See application file for complete search history.

(56) References Cited

U.S. PATENT DOCUMENTS

| 4,755,053 A | * | 7/1988 | Levinson | G03F 9/7076 356/399 |
|---|---|---|---|---|
| 5,954,525 A | * | 9/1999 | Siegal | A47B 21/06 312/223.6 |
| 2012/0084049 A1 | * | 4/2012 | Wooi Quan | G01B 11/27 702/150 |
| 2015/0362893 A1 | * | 12/2015 | Masserot | G04G 5/00 368/4 |
| 2015/0378487 A1 | * | 12/2015 | Meer | G09G 3/20 345/207 |

* cited by examiner

*Primary Examiner* — Darryl J Collins
*Assistant Examiner* — Journey Sumlar
(74) *Attorney, Agent, or Firm* — Faegre Baker Daniels LLP (57) ABSTRACT

This disclosure describes techniques and apparatuses for rotational alignment of a circular display and a circular lens. In one or more implementations, a display device, such as a smart watch, includes a circular lens assembly that overlays a circular display assembly. The display device includes at least two alignment points positioned along the perimeter of the circular display assembly that enable a machine vision system to rotationally align the circular display assembly to the circular lens assembly. At least one of the alignment points includes a target mark on the perimeter of the circular lens assembly that is viewable by the machine vision system through a corresponding alignment hole on the perimeter of the circular display assembly. The alignment hole is within a border region of the circular display assembly, but is sized and positioned so that it does not impact the structure of the circular display assembly.

19 Claims, 5 Drawing Sheets

ROTATIONAL ALIGNMENT OF A CIRCULAR DISPLAY AND A CIRCULAR LENS

BACKGROUND

This background description is provided for the purpose of generally presenting the context of the disclosure. Unless otherwise indicated herein, material described in this section is neither expressly nor impliedly admitted to be prior art to the present disclosure or the appended claims Machine vision systems can be implemented to assemble hardware parts so that the hardware parts are perfectly aligned with each other when assembled. With rectangular hardware parts, the machine vision system aligns x and y positions of the hardware parts by aligning edges of each part. However, alignment of two circular hardware parts is more difficult because even if the edges of each hardware part are aligned, the hardware parts may not be rotationally aligned.

BRIEF DESCRIPTION OF THE DRAWINGS

Techniques and apparatuses enabling rotational alignment of a circular display and a circular lens are described with reference to the following drawings. The same numbers are used throughout to reference like features and components.

DETAILED DESCRIPTION

Machine vision systems can be implemented to assemble hardware parts, such as a display and a lens that covers the display, so that the hardware parts are perfectly aligned with each other when assembled. For example, holes may be cut into a first hardware part to enable the machine vision system to view corresponding target points on a second hardware part. The machine vision system may then align the first hardware part with the second hardware part by positioning the first hardware part such that the target points on the second hardware part are viewable through the holes on the first hardware part.

With square or rectangular shaped hardware parts, the machine vision system may align the x and y positions of the hardware parts by aligning the edges of the parts using the holes and target points. However, alignment of two circular hardware parts is more difficult because even if the edges of the parts are aligned, the hardware parts may not be rotationally aligned.

This disclosure describes techniques and apparatuses for rotational alignment of a circular display and a circular lens. In one or more implementations, a display device, such as a smart watch, includes a circular lens assembly that overlays a circular display assembly. The circular lens assembly includes a touch sensor that enables users to interact with information displayed on a display of the circular display assembly via touch input to the circular lens assembly.

Conventionally it is difficult to add rotational alignment features to a display without either increasing the diameter of the display or impacting the structure of the display. For example, if rotational alignment features, such as holes, are added to the active area of the display, these holes may weaken the display. Thus, such alignment holes are may be added to a border region of the display that is outside the active area of the display. However, adding alignment holes to the border region of the display often weakens the display. As such, manufacturers often increase the width of the border region so that the structure is not weakened by the alignment holes which causes the total diameter of the display to increase. Conventionally the width of the border region may be 15 to 30% of the total diameter of the display. Manufacturers would prefer that the border region is as small as possible relative to the size of the display and thus would prefer to fit the rotational features into a small border region.

Thus, in various implementations, the display device includes at least two alignment points positioned along the perimeter of the circular display assembly that enable a machine vision system to rotationally align the circular display assembly to the circular lens assembly. The alignment points are positioned in a border region that has a small width relative to the total diameter of the circular display assembly. At least one of the alignment points includes a target mark on the perimeter of the circular lens assembly that is viewable by the machine vision system through a corresponding alignment hole on the perimeter of the circular display assembly. The alignment hole is sized and positioned so that it does not cause the width of the border region of the display to be increased.

The following discussion first describes an operating environment, followed by techniques that may be employed in this environment, and ends with an example electronic device.

Operating Environment

Figure 1:
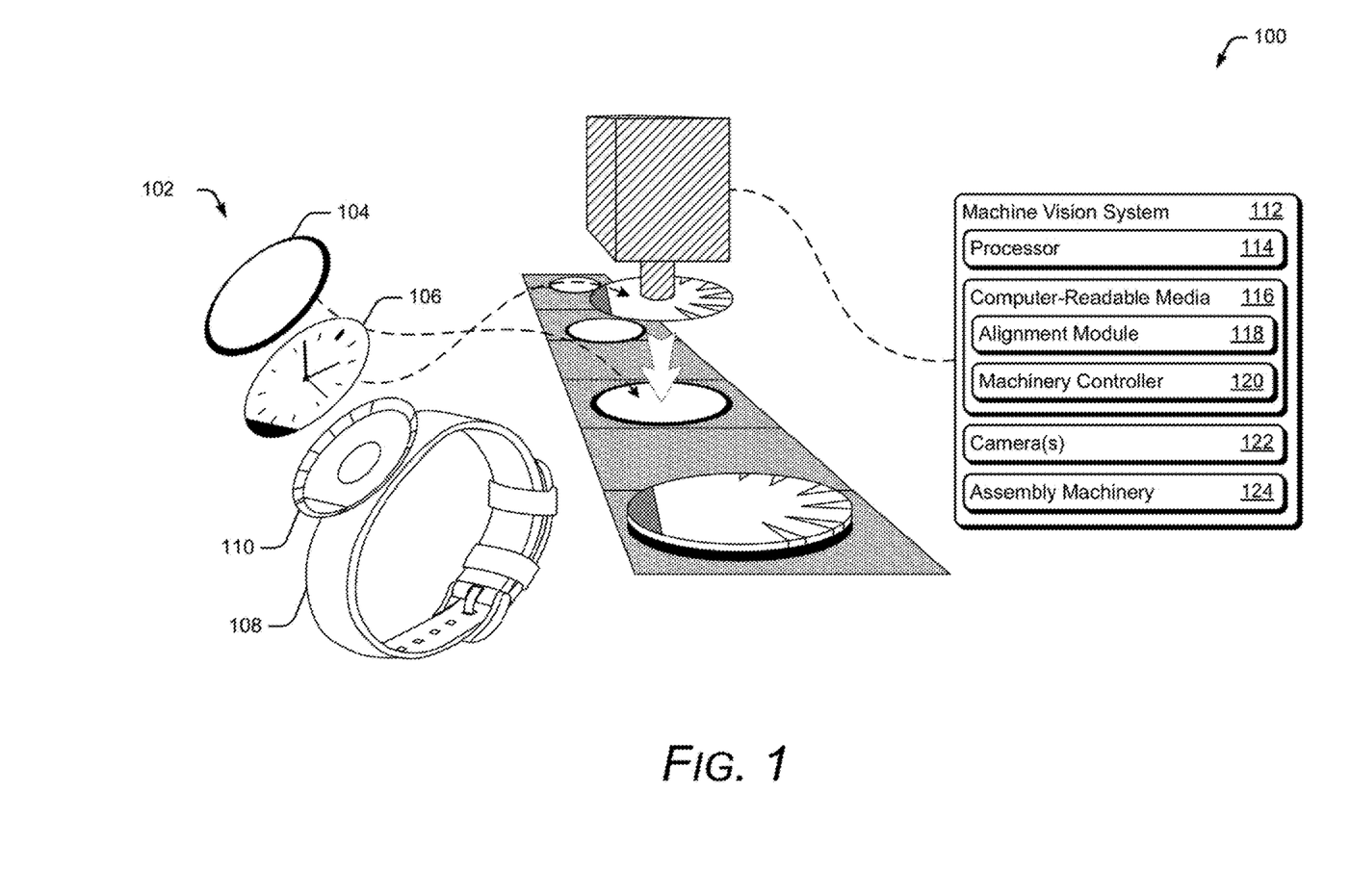
FIG. 1 illustrates an example environment in which techniques described herein can be implemented.

FIG. 1 illustrates an example environment 100 in which techniques described herein can be implemented. Environment 100 includes an exploded view of a display device 102. In this example, display device 102 is depicted as a smart watch, although other devices are contemplated. Other display devices 102 may include, by way of example and not limitation, a mobile phone, notebook computer (e.g., netbook or ultrabook), camera (compact or single-lens reflex) smart-watch, smart-glasses, tablet computer, personal media player, personal navigating device (e.g., global positioning system), gaming console, desktop computer, video camera, or portable gaming device.

In this example, display device 102 includes a circular lens assembly 104, a circular display assembly 106, and a wrist strap 108 that includes a base 110. The circular display assembly may have substantially the same diameter as the circular lens assembly. Thus, when display device 102 is assembled, the circular lens assembly 104 completely overlays the circular display assembly 106, which is coupled to wrist strap 108 at base 110. Display device 102 can also be implemented with any number and combination of differing components as further described with reference to the example device shown in FIG. 5.

Figure 2:
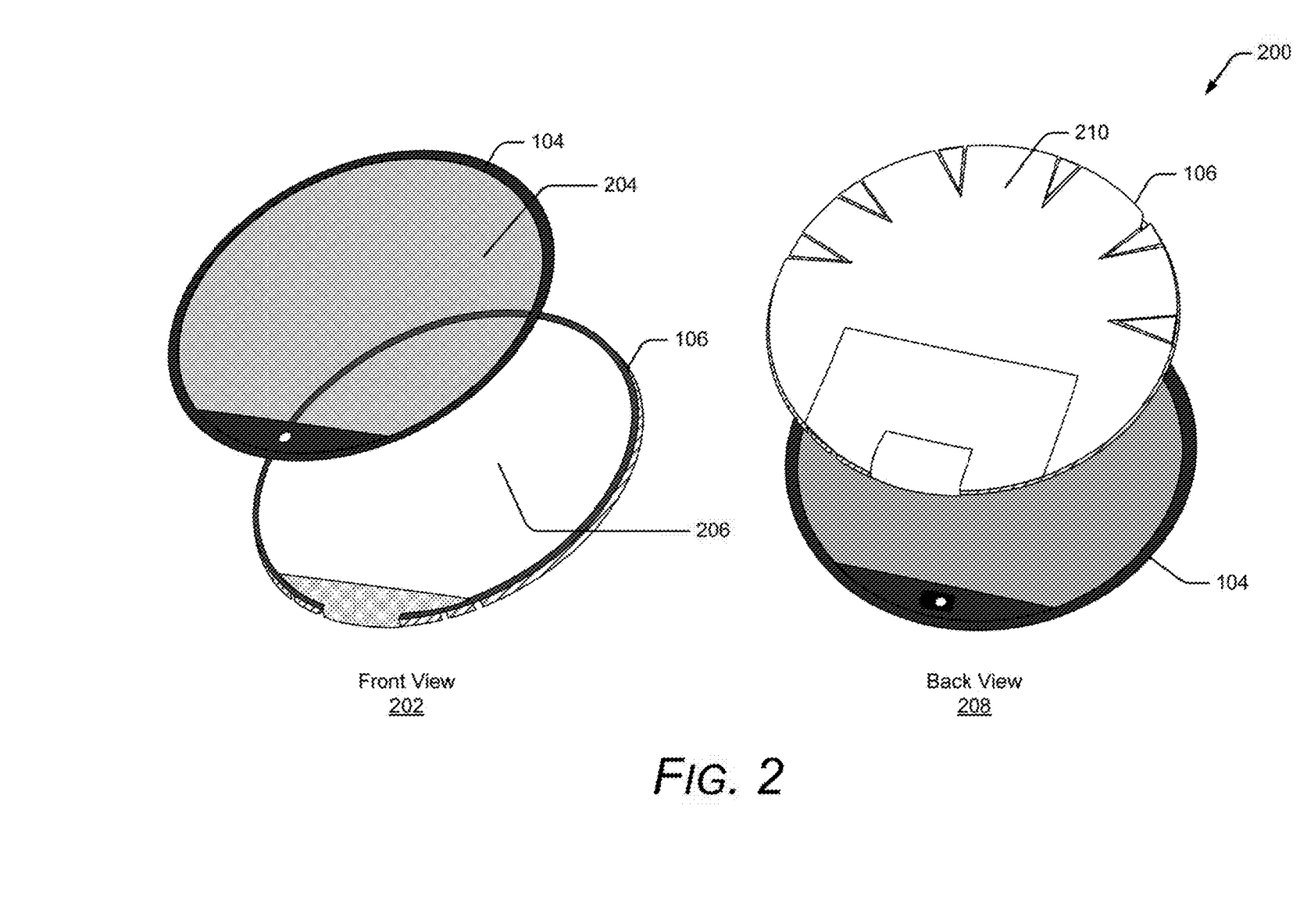
FIG. 2 illustrates an example of the circular lens assembly and the circular display assembly depicted in FIG. 1, but in greater detail.

FIG. 2 illustrates an example 200 of the circular lens assembly and the circular display assembly depicted in FIG. 1, but in greater detail.

At 202, a front view of the circular lens assembly and the circular display assembly is illustrated. In this view, the circular lens assembly 104 overlays the circular display assembly 106. This is the orientation of the circular lens assembly and the circular display assembly when display device 102 is assembled.

Circular lens assembly 104 includes a lens 204. Lens 204 is configured to overlay and protect circular display assembly 106, and can be made from any type of material, such as glass or plastic. In one or more implementations, circular lens assembly 104 may also include a touch sensor (not pictured) that is configured to receive touch input from a user. The touch sensor is implemented on the back side of circular lens assembly 104 (between lens 204 and circular display assembly 106), and thus is protected by lens 204. The touch sensor may be transparent, or at least partially transparent.

In one or more implementations, circular lens assembly 104 includes artwork along the perimeter of the lens. In FIG. 2, the artwork is illustrated as a black stripe along the perimeter of lens 204. The artwork may be used for decorative purposes, but may also include target marks at various positions in the artwork which usable to align circular lens assembly 104 with circular display assembly 106 during manufacturing. This will be discussed in more detail below with regards to FIG. 3.

Circular display assembly 106 includes a display 206 which is configured to render images for viewing (such as the clock face illustrated in FIG. 1). Display 206 may be implemented as a liquid crystal display (LCD) or any other type of flat panel circular display.

In one or more implementations, circular display assembly 106 includes an active area and a border region. The active area of circular display assembly 106 includes active pixels that are used to display content. The border region of circular display assembly 106 provides structure for circular display assembly 106. In conventional displays, the width of the border region may be approximately 15 to 30% of the total diameter of the display (which includes both the active area and the border region). For example, if the total diameter of the display is 48 millimeters, conventional displays may include a border region that is 8 to 10 millimeters. It is to be appreciated, therefore that the border region of conventional displays greatly increases the diameter, and thus the total size, of the display.

In one or more implementations the width of the border region of circular display assembly 106 is less than 5% of the diameter of circular display assembly 106. For example, the total diameter of circular display assembly 106 may range from 40 to 50 millimeters, and the width of the border region may range from 1 to 2 millimeters.

Circular lens assembly 104 enables a user to interact with content (e.g., information and images) rendered on display 206 of circular display assembly 106. For example, in FIG. 1, the display renders images resembling a face of an analog watch. However, the display may transition to displaying other information responsive to receiving touch input from a user. For instance, a user may be able to touch lens 204 to cause display 206 to display a list of calendar appointments, social media updates, emails, and the like.

In one or more implementations, circular display assembly 106 further includes a bezel. For example, at 208, a back view of circular lens assembly 104 and circular display assembly 106 is illustrated. In this view, circular display assembly 106 overlays circular lens assembly 104, and a bezel 210 is positioned around the edges and the back side of circular display assembly 106. Bezel 210 may be made from a non-transparent material, such as metal or plastic and may be coupled to a housing of display 206.

FIG. 1 further illustrates a machine vision system 112 which can be implemented to assemble circular display assembly 106 to circular lens assembly 104. Machine vision system 112 may be implemented as any type of existing machine vision system operable to assemble hardware parts.

Machine vision system 112 includes a processor 114, which may be configured as a single or multi-core processor capable of enabling various functionalities of the machine vision system 112. Processor 114 may be coupled with, and may implement functionalities of, any other components or modules of machine vision system 112 that are described herein.

Machine vision system 112 includes computer-readable media 116. Computer-readable media 116 may include device data, such as an operating system, firmware, or applications of machine vision system 112 that are executable by processor 114. Computer-readable media 116 also include an alignment module 118 and a machinery controller 120.

Alignment module 118 is configured to receive image data from one or more cameras 122 of machine vision system 112. Cameras 122 may be positioned above circular display assembly 106 and the circular lens assembly 104 in machine vision system 112. The image data received from cameras 122 can be used by the alignment module 118 to rotationally align circular display assembly 106 with circular lens assembly 104.

Machinery controller 120 controls assembly machinery 124 based on instructions received from the alignment module to move and rotate circular display assembly 106 until it is correctly aligned with circular lens assembly 104. Consider, for example, that circular lens assembly 104 is configured to overlay circular display assembly in a specific fashion. In other words, x and y positions of the circular lens assembly are matched with specific x and y positions of the circular display assembly. Additionally, circular display assembly 106 is configured to be rotationally aligned to circular lens assembly 104 in a specific fashion. For example, display device 102 will not function properly if circular display assembly 106 is rotated at an angle relative to circular lens assembly 104 that is different from the intended rotational alignment.

Alignment module 118 receives image data from cameras 122, and determines whether circular display assembly 106 is correctly aligned with circular lens assembly 104. Machinery controller 120 then controls assembly machinery 124, based on instructions received from alignment module 118, to move and rotate the display until it is correctly aligned with the lens. Once the correct alignment is achieved, machinery controller 120 controls assembly machinery 124 to assemble circular display assembly 106 to circular lens assembly 104.

Note that assembly machinery 124 holds circular display assembly 106 such that display 206 of circular display assembly 106 is positioned towards a back side of circular lens assembly 104, as illustrated at 208 in FIG. 2. Cameras 122 are positioned above circular display assembly 106, and thus bezel 210 of circular display assembly 106 obstructs the view of circular lens assembly 104 by cameras 122. Thus, circular display assembly 106 includes one or more alignment holes positioned on the perimeter of the circular display assembly that enable cameras 122 to view target marks on circular lens assembly 104. The alignment holes are positioned in the border region of circular display assembly 106, but are sized and positioned such that they do not cause the width of the border region to be increased. Further, the alignment holes do not impact the structure of circular display assembly 106.

Figure 3:
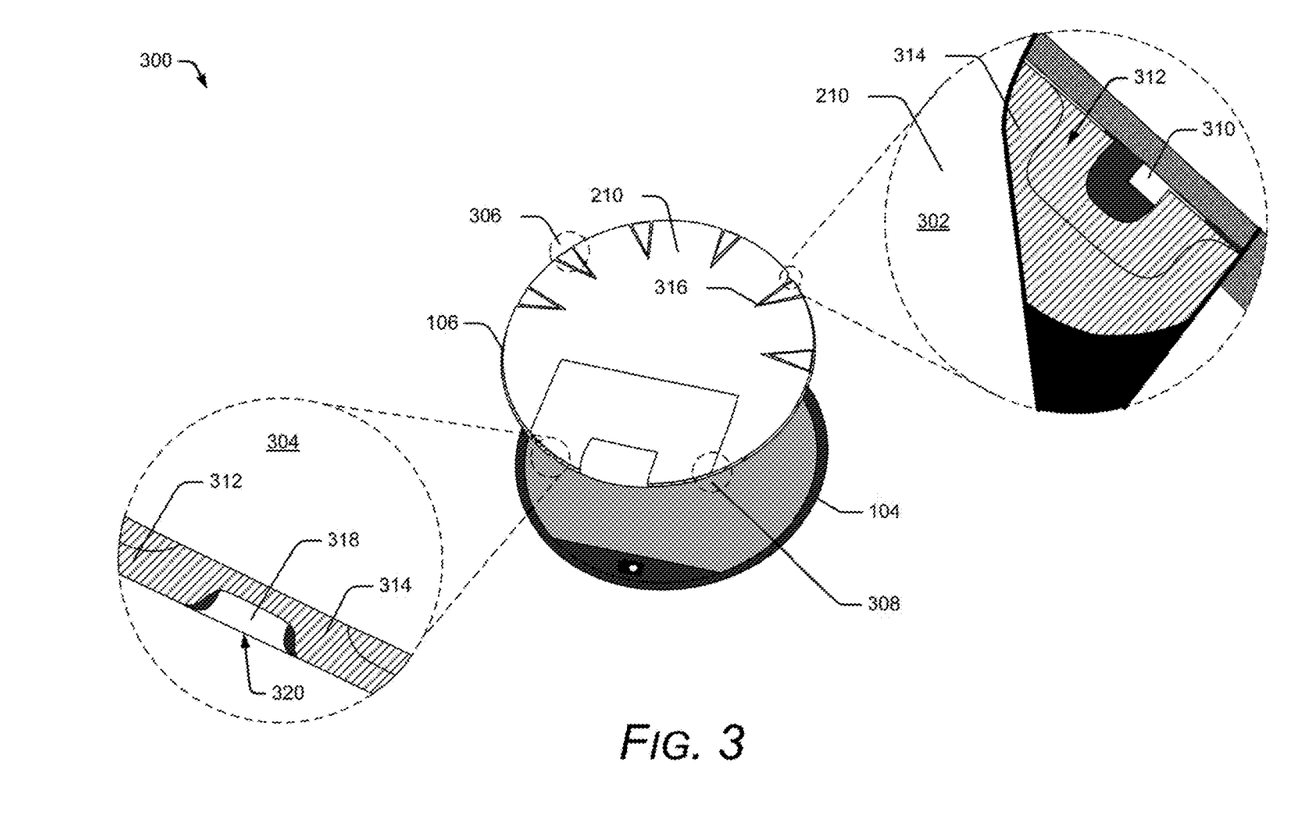
FIG. 3 illustrates another example of the circular lens assembly and the circular display assembly depicted in FIG. 1, but in greater detail.

FIG. 3 illustrates an example 300 of the circular lens assembly and the circular display assembly depicted in FIG. 1, but in greater detail. In this example, circular display assembly 106 includes four alignment points, which are identified as first alignment point 302, second alignment point 304, third alignment point 306, and fourth alignment point 308. These alignment points enable machine vision system 112 to assemble circular display assembly 106 to circular lens assembly 104. It is to be appreciated, however, that less or more alignment points may be used by machine vision system 112 to assemble circular display assembly 106 to circular lens assembly 104. For example, in some implementations, fourth alignment point 308 is optional.

As illustrated in the exploded view of first alignment point 302, the first alignment point corresponds to a first target mark 310 on the circular lens assembly 104 and a first alignment hole 312 on the perimeter of circular display assembly 106. First alignment hole 312 enables cameras 122 of machine vision system 112 to view first target mark 310 when the circular display assembly is rotationally aligned with the circular lens assembly. First alignment hole 312 is on the perimeter of circular display assembly 106 within the border region of display 206.

In this example, first alignment hole 312 is made by cutting back metal of the bezel 210 in a triangular shape, and extending an inner housing 314 of display 206 to the same diameter as the bezel 210. A small cutout is then placed in housing 314 that allows cameras 122 of machine vision system 112 to see through circular display assembly 106 to first target mark 310 on the circular lens assembly 104.

In one or more implementations, the first alignment hole 312 is placed in an area of display 206 that is structurally important, such as an antenna region of circular display assembly 106. Thus, a size of first alignment hole 312 is minimized so that the structure of the circular display assembly 106 is not weakened. Further, using a small alignment hole ensures that the small width of the border region of display 206 does not need to be increased just to add rotational features. For example, in one or more implementations, a width of the first alignment hole 312 is between 0.2 and 0.5 millimeters along the perimeter of circular display assembly 106, and a depth of first alignment hole 312 is between 0.2 to 0.5 millimeters.

In one or more implementations, in order to further decrease the impact on the structure of circular display assembly 106, first alignment hole 312 is cut proximate an existing hole on bezel 210 to create a single, larger hole. In this example, first alignment hole 312 is placed proximate an existing spring contact hole 316 on bezel 210 such that the size of existing spring contact hole 316 is increased. Note that bezel 210 includes multiple spring contact holes, similar to spring contact hole 316. It is to be appreciated that placing first alignment hole 312 proximate an existing hole, rather than creating a new hole, further minimizes the impact of first alignment hole 312 on the structure of circular display assembly 106.

In this example, first target mark 310 is a mark on the artwork along the perimeter of circular lens assembly 104 that is a different color (white in this example) than a primary color of the artwork (black in this example). First target mark 310 is sized as small as possible such that it is still viewable by machine vision system 112 through an optically clear layer of the touch sensor of circular lens assembly 104. In one or more implementations, first target mark 310 has a width of 0.2 to 0.3 millimeters along the perimeter of circular lens assembly 104, and a depth of 0.15 millimeters to 0.25 millimeters. The exact width of first target mark 310, however, may be dependent on the width of first alignment hole 312 so that first target mark 310 is viewable through first alignment hole 312.

In one or more implementations, second alignment point 304 is located approximately 180 degrees along the perimeter of circular display assembly 106 from first alignment point 302. This placement guarantees the greatest possible distance between first alignment point 302 and second alignment point 304 and enables a single camera 122 of machine vision system 112 to see both first alignment point 302 and second alignment point 304. However, the position of second alignment point 304 along the perimeter of circular display assembly 106 may vary.

As illustrated in the exploded view of second alignment point 304, the second alignment point corresponds to a second target mark 318 on the circular lens assembly 104 and a second alignment hole 320 on the perimeter of circular display assembly 104. Second alignment hole 320 enables cameras 122 of machine vision system 112 to view second target mark 318 when the circular display assembly is rotationally aligned with circular lens assembly 104. Second alignment hole 320 is positioned on the perimeter of circular display assembly 106 within the border region of display 206.

Note that second alignment hole 320 is visually different than first alignment hole 312, which enables machine vision system 112 to visually distinguish the first alignment hole from the second alignment hole. In this example, second alignment hole 320 is made by extending the inner housing 314 of display 206 to the same diameter as the bezel 210. A cutout is then placed in housing 314 that allows cameras 122 of machine vision system 112 to see through circular display assembly 106 to second target mark 318 on circular lens assembly 104.

Second alignment hole 320 is not placed in an area of circular display assembly 106 that is as structurally important as the location of first alignment hole 312. Thus, in one or more implementations, a width of second alignment hole 320 along the perimeter of circular display assembly 106 is greater than the width of first alignment hole 312. Note that the greater size of the second alignment hole 320 makes it easier for the cameras 122 of machine vision system 112 to align second target mark 318 with second alignment hole 320. In one or more implementations, the width of the second alignment hole is between 0.3 and 0.6 millimeters along the perimeter of circular display assembly 106, and the depth of second alignment hole 314 is between 0.2 to 0.5 millimeters.

Similar to the first target mark 310, second target mark 318 is a mark on the artwork along the perimeter of circular lens assembly 104 that is a different color (white in this example) than a primary color of the artwork (black in this example). Second target mark 318 is viewable by machine vision system 112 through an optically clear layer of the touch sensor of circular lens assembly 104.

In one or more implementations, second target mark 318 is visually different than first target mark 310. For example, second target mark 318 may have a different length, color, shape, or width. The width of second target mark 318 may be dependent on the width of second alignment hole 320. Thus, the width of second target mark 318 may be greater than the width of first target mark 310. In one or more implementations, second target mark 318 has a width of 0.3 millimeters to 0.5 millimeters.

Third alignment point 306 may be implemented as a point on the perimeter of bezel 210 of circular display assembly 106. In order to align circular display assembly 106 to circular lens assembly 104 using third alignment point 306, machine vision system 112 matches the third alignment point 306 to an edge of circular lens assembly 104. It should be noted that the diameters of circular lens assembly 104 and circular display assembly 106 may vary by up to 0.2 millimeters. This variance in diameters means that machine vision system 112 may use one alignment point that is not a hole to match edges of circular display assembly 106 with edges of circular lens assembly 104. Thus, alignment holes are used for first alignment point 302 and second alignment point 304, as described above, and a point on bezel 210 is used for third alignment point 306. Alternately, however, third alignment point 306 may be implemented as a hole and a target point, similar to first alignment point 302 and second alignment point 304.

Fourth alignment point 308 is also positioned on the perimeter of circular display assembly 106. Fourth alignment point 308 is useable by machine vision system 112 to ensure that both circular display assembly 106 and circular lens assembly 104 are built to the correct specification and have no defects. For example, if circular display assembly 106 and circular lens assembly 104 are not fully inspected it is possible that circular display assembly 106 is too big, or that circular lens assembly 104 is too small.

In one or more implementations, fourth alignment point 308 includes a small hole on the perimeter of circular display assembly 106. The small hole enables machine vision system 112 to view an edge of circular lens assembly 104 after machine vision system 112 has aligned circular display assembly 106 to circular lens assembly 104 using first, second, and third alignment points. If, however, circular display assembly 106 is too big, or circular lens assembly is too small, machine vision system 112 will be unable to see the edge of circular lens assembly 104 through the hole. Thus, if machine vision system 112 is able to view the edge of circular lens assembly 104 through the hole of fourth alignment point 308 on circular display assembly 106, the machine vision system 112 can confirm that both the circular lens assembly and the circular display assembly are built according to specifications and have no defects.

Example Techniques

The following discussion describes techniques for rotational alignment of a circular display and a circular lens. These techniques can be implemented using the previously described environment, such as circular lens assembly 104, circular display assembly 106, and machine vision system 112 of FIG. 1. These techniques include the example method illustrated in FIG. 4, which is shown as operations performed by one or more entities. The order in which operation of this method is shown or described is not intended to be construed as a limitation, and any number or combination of the described method operations can be combined in any order to implement a method, or an alternate, including that illustrated by FIG. 4.

Figure 4:
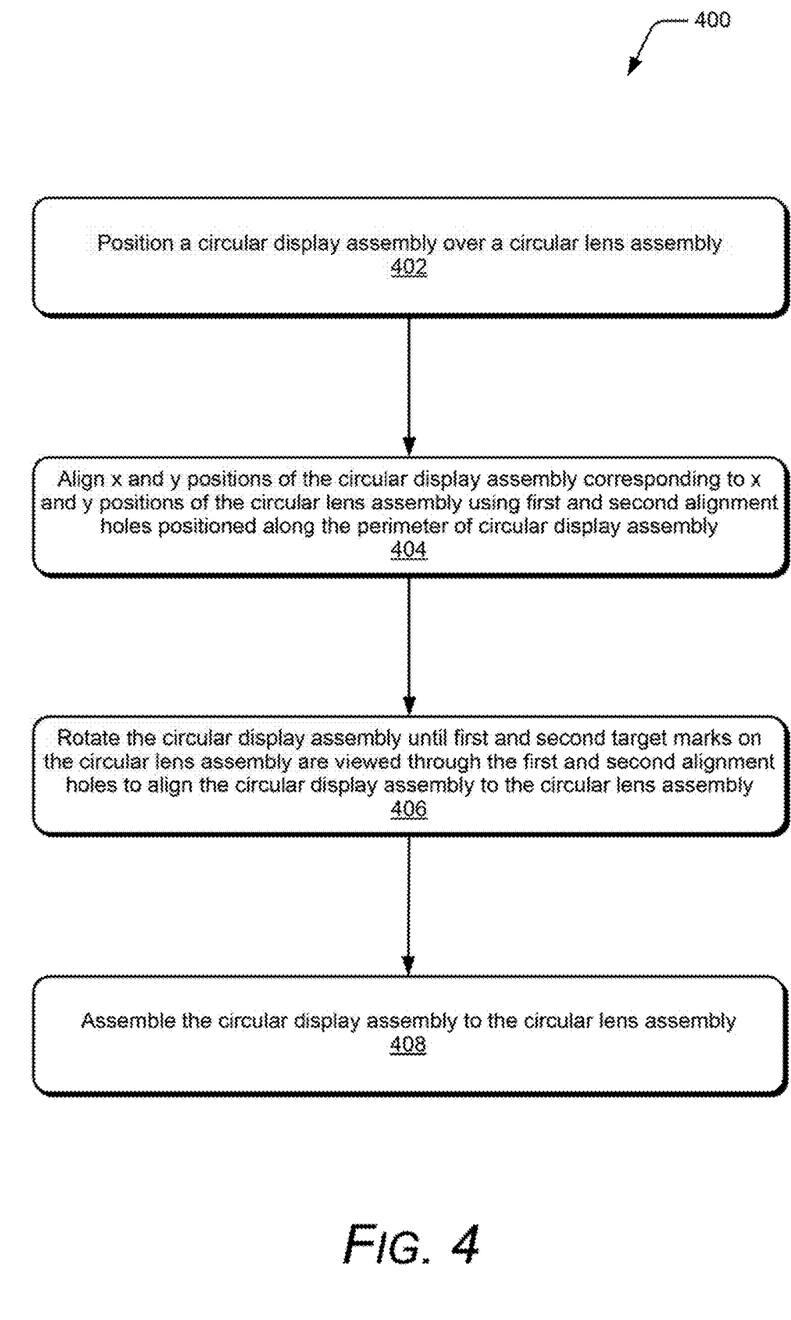
FIG. 4 illustrates an example method of rotationally aligning a circular display assembly to a circular lens assembly by a machine vision system.

FIG. 4 illustrates a method 400 of rotationally aligning a circular display assembly and a circular lens assembly by a machine vision system.

At 402, a circular display assembly is positioned over a circular lens assembly. For example, alignment module 118 receives image data from cameras 122, and generates instructions for positioning circular display assembly 106 over circular lens assembly 104. Then, using the instructions generated by alignment module 118, machinery controller 120 controls assembly machinery 124 to position circular display assembly 106 over circular lens assembly 104.

At 404, x and y positions of the circular display assembly are aligned to corresponding x and y positions of the circular lens assembly using a first alignment hole and a second alignment hole positioned along the perimeter of the circular display assembly. For example, alignment module 118 receives image data from cameras 122, and generates instructions for aligning x and y positions of circular display assembly 106 with x and y positions of circular lens assembly 104 using first alignment hole 312 and second alignment hole 320 positioned on the perimeter of circular display assembly 106.

To do so, alignment module 118 locates first alignment hole 312 and second alignment hole in the image data. In one or more implementations, alignment module may also locate third alignment point 306 in the image data. In one or more implementations, alignment module uses a fourth alignment point to ensure that both circular display assembly 106 and circular lens assembly 104 are built to the correct specification.

Then, alignment module 118 generates instructions to move circular display assembly 106 so that the three alignment points are aligned with edges of circular lens assembly 104. Machinery controller 120 receives the instructions from alignment module 118, and controls assembly machinery 124 to position circular display assembly 106 over circular lens assembly 104 such that x and y coordinates of circular display assembly 106 correspond to x and y coordinates of circular lens assembly 104.

At 406, the circular display assembly is rotationally aligned to the circular lens assembly by rotating the circular display assembly until a first target mark on the circular lens assembly is viewable by the machine vision system through the first alignment hole and a second target mark on the circular lens assembly is viewable by the machine vision system through the second alignment hole. For example, machinery controller 120 rotates circular display assembly 106 until first target mark 310 on circular lens assembly 104 is viewable by cameras 122 of machine vision system 112 through first alignment hole 312 and second target mark 318 is viewable by cameras 122 of machine vision system 112 through second alignment hole 320.

To do so, machinery controller rotates circular display module, and alignment module 118 monitors image data received from cameras 122. Alignment module then causes machinery controller 120 to stop the rotation when the image data indicates that first target mark 310 is viewable through first alignment hole 312 and that second target mark 318 is viewable through second alignment hole 320.

At 408, the circular display assembly is assembled to the circular lens assembly. For example, machinery controller controls the assembly machinery 124 to assemble circular display assembly 106 to circular lens assembly 104.

Example Electronic Device

Figure 5:
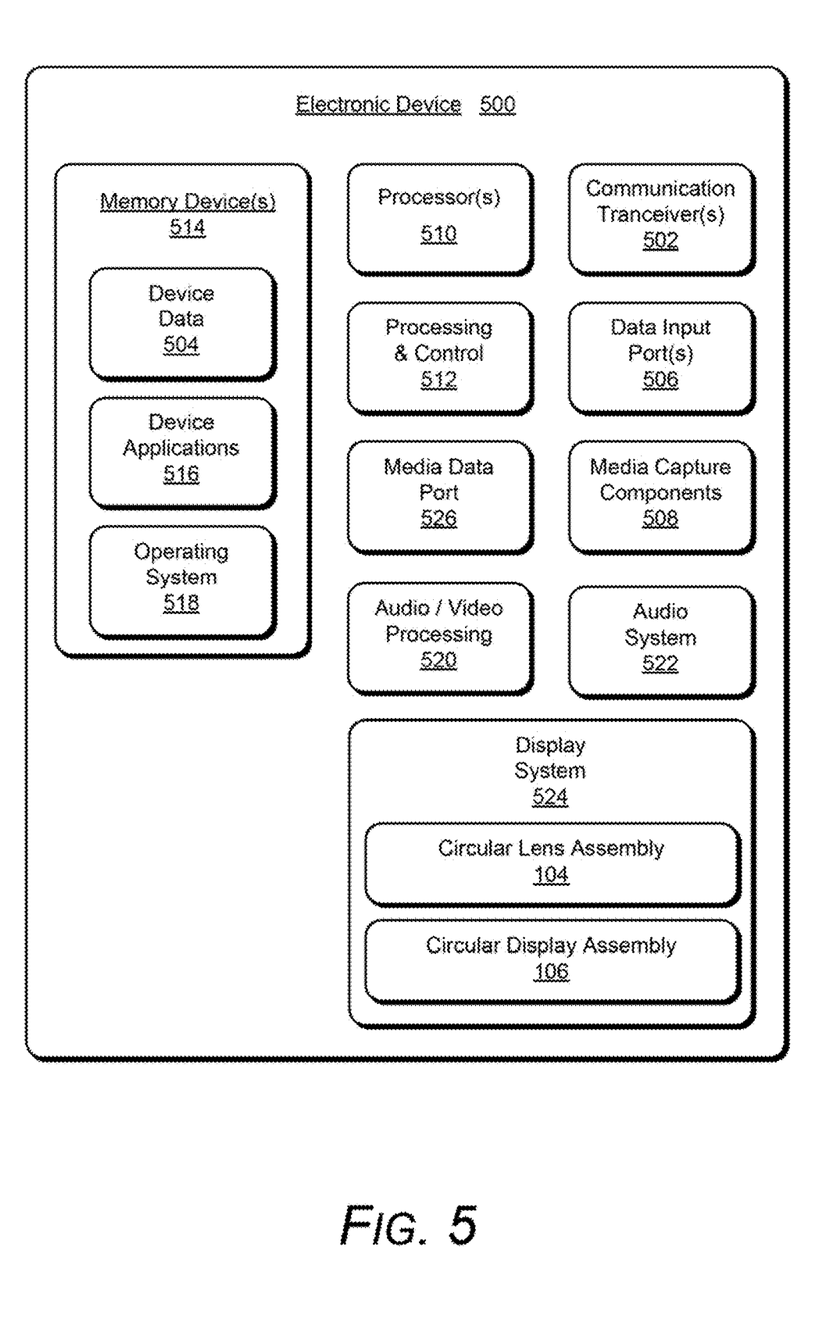
FIG. 5 illustrates various components of an example electronic device that includes a circular lens assembly and a circular display assembly in accordance with one or more implementations.

FIG. 5 illustrates various components of an example electronic device 500 that can implement embodiments of rotational alignment of a circular display and a circular lens. For example, the electronic device 500 may be implemented as any type of display device that includes a circular display assembly and a circular lens assembly, such as display device 102 of FIG. 1.

The electronic device 500 includes communication transceivers 502 that enable wired and/or wireless communication of device data 504, such as received data, data that is being received, data scheduled for broadcast, data packets of the data, etc. Example communication transceivers 502 include wireless personal-area-network (WPAN) radios compliant with various IEEE 802.15 standards, Bluetooth™ standards, wireless local-area-network (WLAN) radios compliant with any of the various IEEE 802.11 (also referred to as WiFi™) standards, wireless-wide-area-network (WWAN) radios for cellular telephony, wireless-metropolitan-area-network (WMAN) radios compliant with various IEEE 802.16 (also referred to as WiMAX™) standards, and wired local-area-network (LAN) Ethernet transceivers.

The electronic device 500 may also include one or more data input ports 506 via which any type of data, media content, and/or inputs can be received, such as user-selectable inputs, messages, music, television content, recorded video content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the computer device to components, peripherals, or accessories such as microphones or cameras. Additionally, the electronic device 500 may include media capture components 508, such as an integrated microphone to capture audio and a camera to capture still images and/or video media content.

The electronic device 500 includes one or more processors 510 (e.g., any of microprocessors, controllers, and the like), which process computer-executable instructions to control operation of the device. Alternatively or in addition, the computer device can be implemented with any one or combination of software, hardware, firmware, or fixed logic circuitry that is implemented in connection with processing and control circuits, which are generally identified at 512. Although not shown, the computer device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 500 also includes one or more memory devices 514 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The electronic device 500 may also include a mass storage media device.

A memory device 514 provides data storage mechanisms to store the device data 504, other types of information and/or data, and various device applications 516 (e.g., software applications). For example, an operating system 518 can be maintained as software instructions within a memory device and executed on the processors 510. The device applications may also include a device manager, such as any form of a control application, software application, signal-processing and control module, code that is native to a particular device, a hardware abstraction layer for a particular device, and so on.

The electronic device 500 also includes an audio and/or video processing system 520 that generates audio data for an audio system 522 and/or generates display data for a display system 524. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 526. Additionally, the audio system and/or the display system may be external components to the computer device, or alternatively, are integrated components of the example computer device.

In embodiments, display system 524 includes the circular lens assembly 104 and the circular display assembly 106 shown in FIGS. 1, 2, and 3.

Although embodiments of rotational alignment of a circular display and a circular lens have been described in language specific to features and/or methods, the subject of the appended claims is not necessarily limited to the specific features or methods described. Rather, the specific features and methods are disclosed as example implementations of rotational alignment of a circular display and a circular lens.

The invention claimed is:

1. A display device comprising:
    a circular lens assembly that includes a lens and a touch sensor; and
    a circular display assembly that includes a display and a bezel, the circular display assembly assembled to the circular lens assembly wherein:
        the circular lens assembly comprises a first target mark at a first location on the lens assembly and the circular display assembly comprises a first alignment hole at a first location on the display assembly and on the perimeter of the circular display assembly that enables a viewing of the first target mark; and
        the circular lens assembly comprises a second target mark at a second location on the lens assembly that is different than the first location of the first target mark, and the circular display assembly comprises a second alignment hole at a second location on the display assembly that is different than the first location of the first alignment hole and on the perimeter of the circular display assembly that enables a viewing of the second target mark, wherein the first target mark is visually different than the second target mark when viewed through the first alignment hole and the second alignment hole, respectively, in at least one of: length, color, shape, and width, and wherein a length of the first alignment hole is different than a length of the second alignment hole.

2. The display device of claim 1, wherein the first alignment hole is located approximately 180 degrees around the perimeter of the circular display assembly from the second alignment hole.

3. The display device of claim 1, wherein the circular display assembly includes an active area and a border region, wherein the first alignment hole and the second alignment hole are positioned within the border region of the circular display assembly, and wherein a width of the border region is less than 5% of a diameter of the circular display assembly.

4. The display device of claim 1, wherein a width of the first alignment hole is between 0.2 and 0.5 millimeters along the perimeter of the circular display assembly, and a depth of the first alignment hole is between 0.2 to 0.5 millimeters.

5. The display device of claim 1, wherein a width of the second alignment hole is between 0.3 and 0.6 millimeters along the perimeter of the circular display assembly and a depth of the second alignment hole is between 0.2 to 0.5 millimeters.

6. The display device of claim 1, wherein the circular lens assembly includes artwork along the perimeter of the circular lens assembly, and wherein the first target mark and the second target mark comprise marks on the artwork that are a different color than a primary color of artwork along the perimeter of the circular lens assembly.

7. The display device of claim 1, wherein the first target mark and the second target mark are viewable through an optically clear layer of the touch sensor of the circular lens assembly.

8. The display device of claim 1, wherein the first alignment hole is positioned proximate an existing spring contact hole on the bezel of the circular display assembly.

9. The display device of claim 1, wherein:
the first target mark and the first alignment hole correspond to a first alignment point, the second target mark and second alignment hole correspond to a second alignment point, and the display device further comprises a third alignment point located on the perimeter of the bezel of the circular display assembly; and
the first alignment point, second alignment point, and third alignment point are used to align x and y coordinates of the circular display assembly to corresponding x and y coordinates of the circular lens assembly, and wherein the first alignment point and the second alignment point are used to rotationally align the circular display assembly to the circular lens assembly.

10. The display device of claim 9, further comprising a fourth alignment point on the perimeter of the circular display assembly, wherein the fourth alignment point is used to confirm that the circular assembly and the circular lens assembly do not have defects.

11. The display device of claim 1, wherein the display device comprises a smart watch, wherein the smart watch further includes a wristband and a base coupled to the wristband, and wherein a back side of the circular display assembly is coupled to the base.

12. A computer-implemented method to assemble a circular display assembly to a circular lens assembly by a machine vision system, wherein the circular lens assembly includes a first target mark at a first location and a second target mark at a second location that is different than the first location of the first target mark, and the circular display assembly includes a first alignment hole at a first location on the perimeter and a second alignment hole at a second location on the perimeter that is different than the first location of the first alignment hole, the method comprising:
positioning the circular display assembly over the circular lens assembly;
aligning x and y positions of the circular display assembly to corresponding x and y positions of the circular lens assembly using the first alignment hole positioned along the perimeter of the circular display assembly and the second alignment hole positioned along the perimeter of the circular display assembly;
rotationally aligning the circular display assembly to the circular lens assembly by rotating the circular display assembly until the first target mark on the circular lens assembly is viewable by the machine vision system through the first alignment hole and the second target mark on the circular lens assembly is viewable by the machine vision system through the second alignment hole, wherein the first target mark is visually different than the second target mark when viewed through the first alignment hole and the second alignment hole, respectively, in at least one of: length, color, shape, and width, and wherein a length of the first alignment hole is different than a length of the second alignment hole; and
assembling the circular display assembly to the circular lens assembly.

13. The computer-implemented method of claim 12, wherein the aligning x and y positions of the circular display assembly to corresponding x and y positions of the circular lens assembly sensor further uses an alignment point located on the perimeter of the circular display assembly.

14. The computer-implemented method of claim 12, further comprising verifying that the circular display assembly and the circular lens assembly do not have defects using a third alignment hole positioned along the perimeter of the circular display assembly.

15. The computer-implemented method of claim 12, wherein the positioning comprises positioning a front side of the circular display assembly over a back side of the circular lens assembly.

16. The computer-implemented method of claim 12, wherein the second alignment hole is positioned approximately 180 degrees from the first alignment hole along the perimeter of the circular display assembly.

17. A smart watch comprising:
a wristband;
a base coupled to the wristband;
a circular display, a backside of the circular display coupled to the base, and a front side of the circular display configured to display a watch face;
a circular lens and touch sensor overlaying the circular display, the circular display assembled to the circular lens and touch sensor wherein:
the circular lens and touch sensor comprise a first target mark at a first location and the circular display comprises a first alignment hole at a first location on the perimeter of the circular display that enables viewing of the first target mark; and
the circular lens and touch sensor comprise a second target mark at a second location that is different than the first location of the first target mark and the circular display comprises a second alignment hole at a second location that is different than the first location of the first alignment hole and on the perimeter of the circular display that enables viewing of the second target mark, wherein the first target mark is visually different than the second target mark when viewed through the first alignment hole and the second alignment hole, respectively, in at least one of: length, color, shape, and width, and wherein a length of the first alignment hole is different than a length of the second alignment hole.

18. The smart watch of claim 17, wherein the display further includes an alignment point on the perimeter of the display that is used to rotationally align the circular display to the circular lens and touch sensor.

19. The smart watch of claim 17, wherein the first alignment hole is located approximately 180 degrees around the perimeter of the circular display assembly from the second alignment hole.

* * * * *